US011458867B2

(12) United States Patent
Gomez et al.

(10) Patent No.: US 11,458,867 B2
(45) Date of Patent: Oct. 4, 2022

(54) OCCUPANT SUPPORT COMPONENT FOR A SEAT OF A VEHICLE AND VEHICLE SEAT

(71) Applicant: Adient Engineering and IP GmbH, Burscheid (DE)

(72) Inventors: John J. Gomez, Howell, MI (US); John Bleau, Phymouth, MI (US); Raza Bashir, Sterling Heights, MI (US); Joseph Gasko, Commerce Charter Township, MI (US); Dalibor Dimovski, Macomb, MI (US)

(73) Assignee: Adient US LLC, Plymouth, MI (US)

( * ) Notice: Subject to any disclaimer, the term of this patent is extended or adjusted under 35 U.S.C. 154(b) by 374 days.

(21) Appl. No.: 16/734,568

(22) Filed: Jan. 6, 2020

(65) Prior Publication Data

US 2020/0215946 A1  Jul. 9, 2020

Related U.S. Application Data

(60) Provisional application No. 62/788,996, filed on Jan. 7, 2019.

(51) Int. Cl.
| | |
|---|---|
| *B60N 2/75* | (2018.01) |
| *B60N 2/20* | (2006.01) |
| *B60N 2/10* | (2006.01) |
| *B60N 2/005* | (2006.01) |
| *B60N 2/60* | (2006.01) |
| *B60N 3/00* | (2006.01) |
| *B60N 2/01* | (2006.01) |
| *B60N 2/16* | (2006.01) |
| *B60R 7/04* | (2006.01) |
| *B60R 22/20* | (2006.01) |

(Continued)

(52) U.S. Cl.
CPC .............. *B60N 2/20* (2013.01); *B60N 2/005* (2013.01); *B60N 2/012* (2013.01); *B60N 2/10* (2013.01); *B60N 2/16* (2013.01); *B60N 2/5621* (2013.01); *B60N 2/6027* (2013.01); *B60N 2/753* (2018.02); *B60N 2/79* (2018.02); *B60N 3/004* (2013.01); *B60R 7/043* (2013.01); *B60R 22/20* (2013.01); *B60R 22/26* (2013.01); *B60N 2/797* (2018.02); *B60N 3/002* (2013.01); *G05D 1/021* (2013.01)

(58) Field of Classification Search
CPC .. B60N 2/5621; B60N 2/5628; B60N 2/5635; B60N 2/5657; B60N 2/797; B60N 2/79; B60N 3/02
USPC ................................. 296/1.09, 1.02
See application file for complete search history.

(56) References Cited

U.S. PATENT DOCUMENTS

| | | | | |
|---|---|---|---|---|
| 1,405,309 | A | * | 1/1922 | Matthews ................. B60N 3/02 297/487 |
| 3,323,835 | A | * | 6/1967 | Barecki .................... B60N 3/02 297/452.2 |

(Continued)

FOREIGN PATENT DOCUMENTS

| | | | | | |
|---|---|---|---|---|---|
| CN | 105857136 | A | * | 8/2016 | |
| FR | 2934979 | A3 | * | 2/2010 | .......... B60N 2/4606 |

(Continued)

*Primary Examiner* — Jason S Morrow
*Assistant Examiner* — Wenwei Zhou
(74) *Attorney, Agent, or Firm* — Marshall & Melhorn, LLC (57) ABSTRACT

The present disclosure relates to an occupant support element that may have at least one structural support element. Further, the present disclosure relates to a vehicle seat that may have such an occupant support element.

13 Claims, 10 Drawing Sheets

(51) Int. Cl.
*B60R 22/26* (2006.01)
*B60N 2/56* (2006.01)
*G05D 1/02* (2020.01)

(56) References Cited

U.S. PATENT DOCUMENTS

| | | | | |
|---|---|---|---|---|
| 2008/0012398 | A1* | 1/2008 | Alacqua | B60N 2/5628 |
| | | | | 297/180.1 |
| 2011/0109114 | A1* | 5/2011 | Kolpasky | B60N 2/797 |
| | | | | 297/344.21 |
| 2011/0272991 | A1* | 11/2011 | Saxton | B60N 2/79 |
| | | | | 297/411.46 |
| 2017/0232872 | A1* | 8/2017 | Faruque | B29C 64/118 |
| | | | | 297/411.46 |
| 2018/0361891 | A1* | 12/2018 | Kato | B60N 2/5657 |
| 2019/0184875 | A1* | 6/2019 | Gomez | B64D 11/0644 |
| 2019/0184877 | A1* | 6/2019 | Gomez | B60N 2/20 |

FOREIGN PATENT DOCUMENTS

| | | | | |
|---|---|---|---|---|
| JP | 2007203822 | A | * | 8/2007 |
| KR | 20170007026 | A | * | 1/2017 |

\* cited by examiner

OCCUPANT SUPPORT COMPONENT FOR A SEAT OF A VEHICLE AND VEHICLE SEAT

BACKGROUND OF THE DISCLOSURE

The present disclosure relates generally to an occupant support component for a vehicle seat and to a vehicle seat comprising such an occupant support component.

In the state of the art, occupant support components for vehicle seats are also known. For example, common occupant support components are configured as armrest structures or consoles which are arranged adjacent the seat. Those armrest structures or consoles may provide a number of receptacles for occupant items. The armrest structures or consoles may be padded for more occupant comfort.

SUMMARY OF THE DISCLOSURE

It is an object of the present disclosure to provide an improved occupant support component for a vehicle seat providing more comfort features and high comfort feeling to an occupant of the vehicle seat. For instance, the present disclosure relates to an improved occupant support component for a vehicle seat, in particular for a seat of an autonomous driving vehicle. Further, it is an object of the disclosure to improve a vehicle seat providing high occupant comfort and more comfort features to an occupant.

According to the disclosure, the object of the occupant support component is solved by the features claimed in claim 1. According to the disclosure, the object of a further occupant support component is solved by the features claimed in claim 2. According to the disclosure, the object of the vehicle seat is solved by the features claimed in claim 14. According to the disclosure, the object of a further vehicle seat is solved by the features claimed in claim 15.

According to the disclosure, an occupant support component for a vehicle seat comprises at least a structural support element comprising at least an upper portion and a side portion which is arranged on one end of the upper portion. In particular, the side portion is coupled to, connected to or formed on the one end of the upper portion. The upper portion is configured to define a top surface or upper surface of the vehicle seat and the side portion is at least configured as an armrest structure for the vehicle seat. For example, the upper portion and the side portion are continuously connected to each other.

Further according to the disclosure, an occupant support component comprising at least a structural support element which is configured to define a surrounding area at least partially surrounding the seat. The structural support element comprises at least a number of integrated air ducts which in communication are configured to create a climate zone in the surrounding area. In particular, the air ducts in communication are configured to create an air circulation and distribution for tempering the climate zone. The climate zone may be provided individually to the occupant of the seat. Air circulation and distribution as well as tempering are adjustable by the occupant or are automatically adjusted by presets of seat features. The structural support element comprises at least an upper portion and a side portion which is formed on one end of the upper portion. The upper portion is configured to define a top surface of the vehicle seat and the side portion is at least configured as an armrest structure for the vehicle seat.

For example, the occupant support component may be provided in fleet services, and autonomous driving vehicles or common driving vehicles. Advantages of the present disclosure are providing a simple and lightweight occupant support component design for a vehicle seat. The support component, in particular the structural support element, may be a 3D-printed element. The structural support element is, e.g., made of composite material. The structural support element may be made of synthetic material or may comprise metal. Furthermore, the structural support element is easily attachable to a vehicle seat, e.g. to a frame structure of the vehicle seat. The structural support element may be arranged on a top surface of a backrest.

The occupant support component is, for instance, a seating area component for a vehicle seat, in particular a vehicle seat assembly. The occupant support component may be assembled to the vehicle seat assembly in an easy manner whereby the occupant support component may be designed individually as requested. The occupant support component increases occupant comfort to an additional level whilst providing a visual appealing design. For example, the structural support element is configured as one-piece part. Moreover, the support element is formed as wrap around shelf or rail-like element developed to accommodate an occupant and to provide an additional level of comfort by letting the occupant position his arm in a higher position compared to common armrest heights or by providing same comfort level to every occupant even with different physical sizes.

According to an embodiment, the upper portion and the side portion are configured as one-piece element. For instance, the structural support element is injection molded or differently manufactured, e.g. formed, casted, extruded or shaped. The upper portion and the side portion may be separated parts joined together by welding, adhering, screwing or the like.

According to an embodiment, the upper portion is arranged on a top surface of a backrest of the vehicle seat. The side portion is arranged lateral adjacent the backrest. For example, the side portion is arranged substantially above and distanced from a seat pan of the vehicle seat. The side portion comprises an extension length at least corresponding with an extension length of the seat pan. In a connection area of the side portion and the upper portion a descending gradient along an extension direction of the side portion is provided. For example, the side portion is tilted with respect to a substantially horizontal plane defined by the upper portion or a top surface of a backrest. The side portion may be tilted with respect to the plane about an angle of more than 0°, e.g. 1° to 25°, in particular 5° to 15°, preferably 10°.

According to a further embodiment, an upper surface of the upper portion and an upper surface of the side portion each faces in a direction towards a ceiling of a vehicle.

According to another embodiment, an upper surface of the upper portion and an upper surface of the side portion form a substantially C-shape, L-shape or J-shape. For example, seen from a top view the upper portion and the side portion connected to each other such that the upper portion and the side portion form a substantially C-shape, L-shape or J-shape.

According to another embodiment, the structural support element comprises an L-shaped upper portion and a U-shaped side portion. In particular, one of the legs of the U-shaped side portion and one of the legs of the L-shaped upper portion are configured as an integral, merged part. The L-shaped upper portion is configured to be arranged on an upper surface of the backrest and the U-shaped side portion is configured to be used as an armrest and which comprises a number of controllable devices. For example, the U-shape is arranged such that parallel legs of the U-shaped side portion are arranged above each other in a vertical direction.

One leg defines an upper armrest structure and the other leg defines a lower armrest structure. The controllable devices are, for instance, a so-called HMI devices for seat control, venting ducts or heating devices and ambient/information LED-lighting devices. The controllable devices are positioned in an ideal location for an occupant of all sizes to access within reach. For example, at least one controllable device, such as an input and output device, is arranged in a bent area, in particular in a connection area of the legs. For instance, the connection area comprises a receptacle for at least one of an occupant input and output device. The controllable device, in particular the input and output device is a bent touch display or a curved touch display. In particular, some of the controllable devices are configured as integral or integrated devices. For example, the support element is a 3D manufactured part into which the controllable devices are built in. It is understood that the term controllable devices also refer to control devices, e.g. control panels, control displays, touch displays, control buttons or the like. So the controllable or control devices may be configured as input and output devices.

In an embodiment, the structural support element comprises at least one of a number of receiving areas or a number of projections for different devices. The receiving areas or projections comprise one of air ducts or venting holes, and recesses to at least partially embed or retain at least one of a number of heating devices, lighting devices, cablings, seat assembly parts, electric or electronic devices, input and output devices or seat controlling devices. For example, the receiving areas and the projections are injection molded to or with the structural support element. The receiving areas and projections may be formed, shaped, extruded, cut out, attached or adhered after manufacturing or assembly of the structural support element.

According to an embodiment, the upper portion comprises at least one receiving area configured as recess for guiding and retaining a seat assembly part, such as a headrest assembly. The side portion comprises at least one receiving area configured as recess for a touch display or a so called infotainment system. The side portion comprises an occupant grip structure. The occupant grip structure may be grabbed by an occupant for egress and ingress aid.

In another embodiment, the side portion comprises a bent over portion coupled to one end of the side portion. The bent over portion is substantially U-shaped, C-shaped or J-shaped. The side portion and the bent over portion are continuously connected to each other. They may be configured as one-piece part such as an injection molded part. The bent over portion is bent in a vertical direction away from the side portion, in particular from the upper surface of the side portion. For example, the bent over portion is bent in a downward direction.

According to a further embodiment, the side portion is configured to define an upper armrest structure and the bent over portion is configured to define a lower armrest structure. For example, an upper surface of the side portion defines an upper armrest structure for the occupant and one end of the bent over portion defines a lower armrest structure for the occupant. If a controllable device, such as an input and output device, in particular a bent display is arranged in the bent over portion, this controllable device is easy reachable and operable by the occupant seated in the seat when resting his arm in the lower armrest structure. At least the lower armrest structure may be padded. The upper armrest structure may be padded. Additionally or optionally, the upper portion and the side portion are covered by a covering or finish, paint or the like.

In a further embodiment, a connecting region of the side portion and the bent over portion comprises a receptacle for at least one of an occupant input and output device. The input and output device may be a controllable device, an entertainment and information device, such as a so called infotainment device. The support element enables various controllable devices to be integrated into the seat unlike conventional automotive seat configurations, e.g. placing control devices in door panels and/or instrument panel.

Further, according to the disclosure, a vehicle seat for a vehicle, comprising at least a backrest and an occupant support component, wherein the occupant support component comprising at least a structural support element comprising at least an upper portion and a side portion which is formed on one end of the upper portion, wherein the upper portion is configured to define a top surface of the backrest and the side portion is at least configured as an armrest structure arranged on laterally with respect to the backrest.

Moreover, according to the disclosure, a vehicle seat for a vehicle, comprising at least a backrest and an occupant support component, wherein the occupant support component comprising at least a structural support element which is configured to define a surrounding area at least partially surrounding the backrest, wherein the structural support element comprises at least a number of integrated air ducts which in communication are configured to create a climate zone in the surrounding area.

Furthermore, according to the disclosure, an information device for a vehicle seat comprises at least one lighting device, such as LED and/or LED strip, which is configured to be activated to inform at least an occupant about one of a seating reservation and/or a direction of travel and/or dynamic motions and/or task related activities. For example, the information device is arranged in an area of the occupant support component. In particular, the lighting device is arranged on the structural support element. Additionally, the lighting device is configured as ambient lighting. In particular, shared mobility scenarios will require seating reservation information, that helps occupants to identify their reserved seat in the vehicle. Moreover, the information device informs occupants of sudden vehicle stops and overall direction of travel. For instance, user specified color lighting is activated under the seat when the occupant enters the vehicle. In another embodiment, the lighting device is arranged under the seat. For instance, a lighting strip is packaged underneath the seat and another lighting strip is packed in a backrest and/or side area of the seat, in particular out of sight. The lighting device provides a plurality of color choices for different identification methods. The lighting device provides visual guidance as well as ambient light for mood setting or task related activities.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION OF PREFERRED EMBODIMENTS

Figure 1:
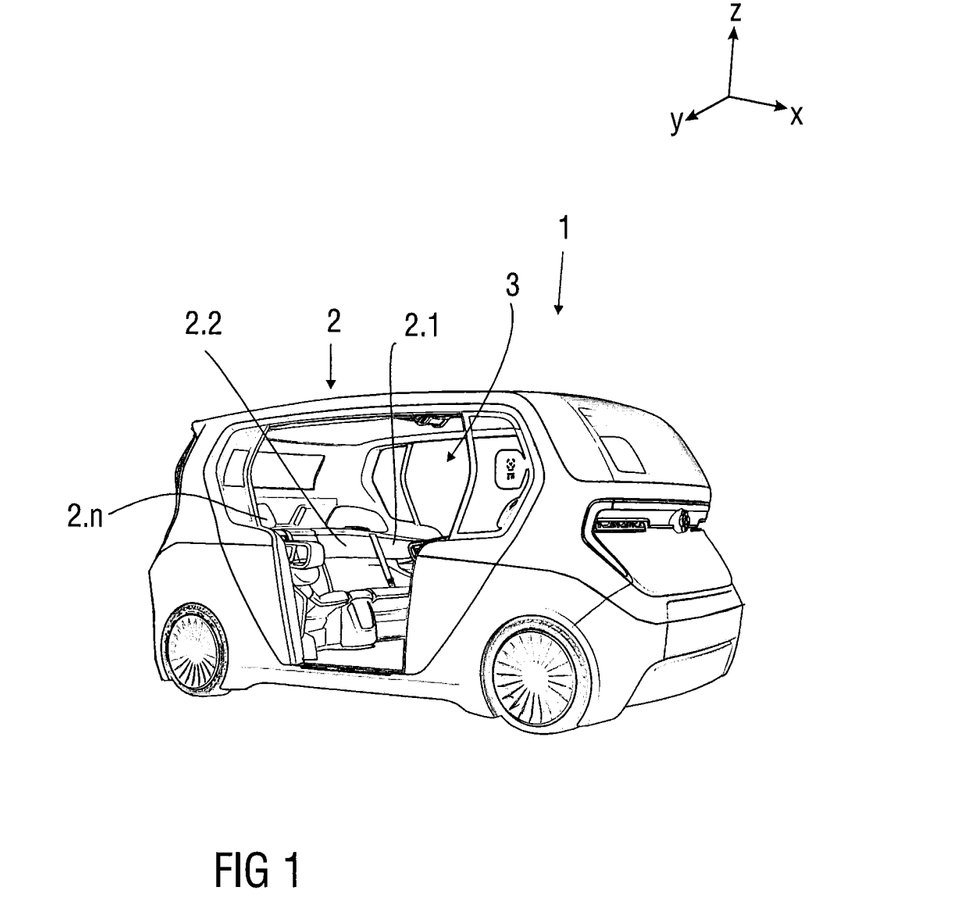
FIG. 1 shows a perspective view of a vehicle comprising a seat arrangement having a plurality of seat assemblies.

FIG. 1 shows a perspective view of an exemplary embodiment of a vehicle 1 comprising a seat arrangement 2 having a plurality of seat assemblies 2.1 to 2.$n$ arranged in a row R1, e.g. a rear row. The vehicle 1 is e.g. an autonomous driving vehicle configured to autonomously pick up and transport occupants. A vehicle interior 3 can be designed as a passenger compartment in more economy way, comfortable way or luxury way for the occupants or as a loading or storage compartment vehicle.

For a better understanding of subsequent descriptions a coordinate system is shown in the figures. The coordinate system comprises a longitudinal axis x, a transverse axis y and a vertical axis z in relation to the vehicle 1. In particular, the longitudinal axis x defines a longitudinal extending direction and length of the vehicle 1, the transverse axis y defines a transverse extension direction and width of the vehicle 1 and the vertical axis z defines a vertical extension direction and height of the vehicle 1.

Figure 2:
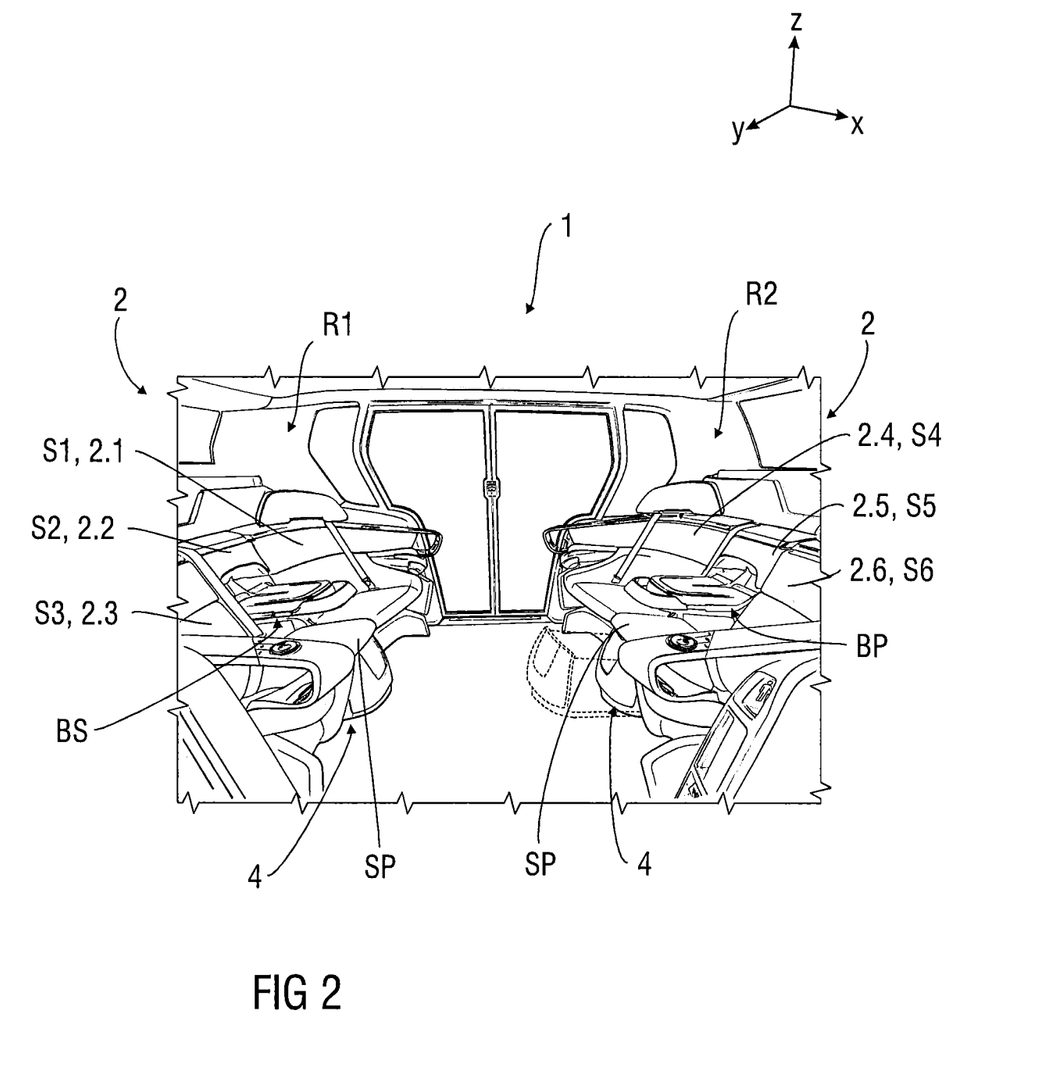
FIG. 2 shows a perspective view of a vehicle interior having at least two rows of a plurality of seat assemblies facing each other.
Figure 3A:
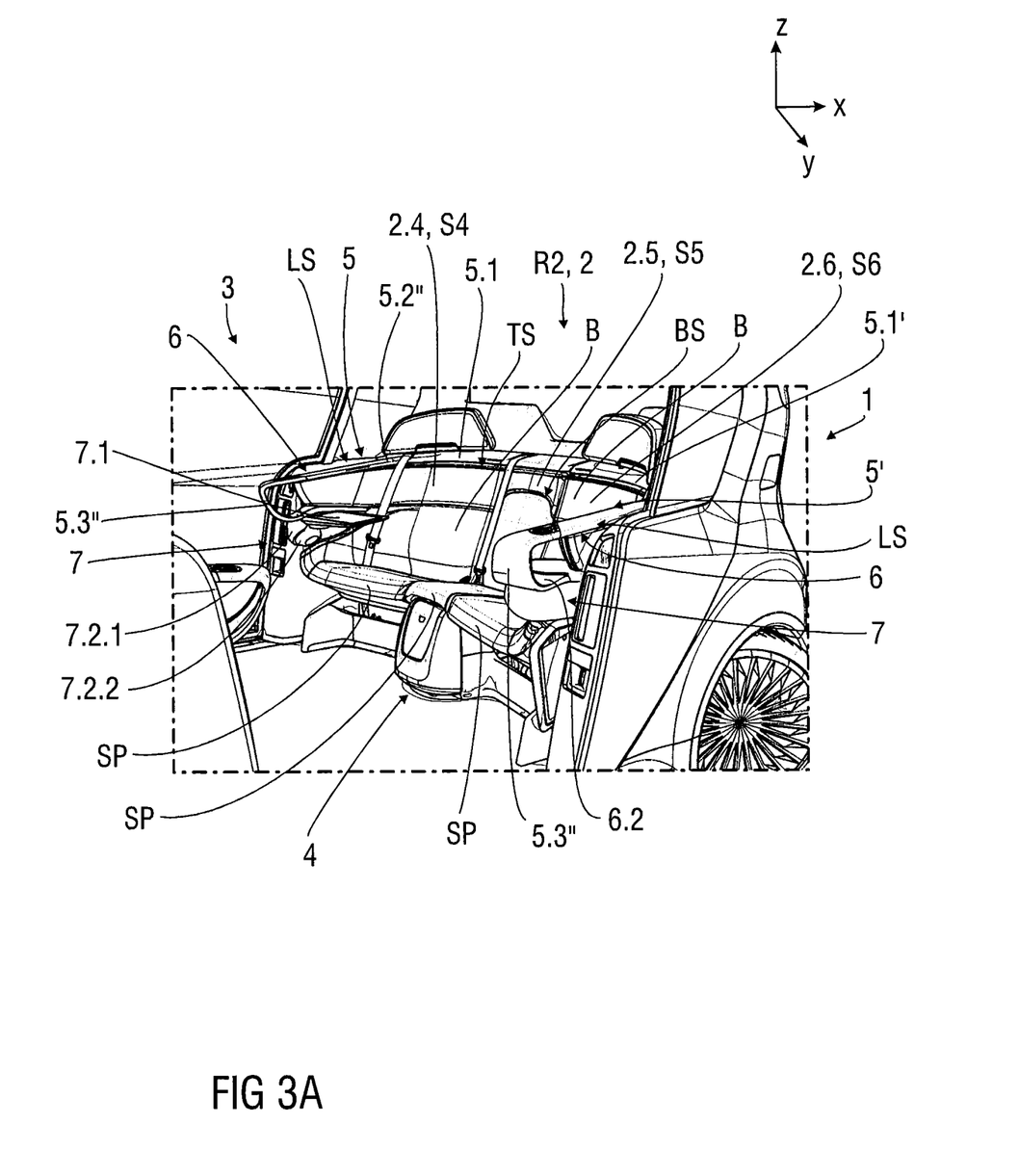
FIG. 3A shows a perspective view of a first embodiment of a vehicle seat row comprising seat assemblies, seats and occupant support components.

FIG. 2 shows a perspective view of a vehicle interior 3 having at least two rows R1, R2, e.g. a rear row and a front row, of a plurality of seat assemblies 2.1 to 2.6 of vehicle seats S1 to S6. Each of the rows R1 and R2 comprises three seat assemblies 2.1 to 2.3 and 2.4 to 2.6 wherein the seat assemblies 2.1 to 2.3 and 2.4 to 2.6 of the rows R1 and R2 are facing each other. Further shown in this FIG. 2, the seat assemblies 2.2 and 2.5 of the seats S2 and S5 may be one of center seat modules for the vehicle 1 comprising a not further shown stationary lower frame structure and a stationary upper frame structure which is coupled to the lower frame structure. The lower frame structure comprises a reversed U-shaped form for carrying a seat pan SP whilst providing storage space underneath the seat pan SP. In particular, the storage space is provided between two spaced apart and parallel running legs of the U-shaped lower frame structure. The seat pan SP is attached to a connection portion of the two legs. Further, the upper frame structure comprises a not further shown adjustment device and a movable backrest shell BS, wherein the adjustment device is configured to adjust the backrest shell BS into an armrest and/or table position BP. The movable backrest shell BS can be transformed into a useable armrest and/or table apparatus. In particular, the adjustment device is configured to lock the backrest shell BS in a desired vertical position as shown in FIG. 3A as well as in a desired tilted position for improved comfort feeling. The storage space can be used for storing a beverage and/or snack bar or bags or other occupant belongings within reach of occupants of the corresponding row R1 or R2. Moreover, the storage space may house an integral under-seat storage bin 4 with a slide-out feature for greater access. Moreover, the center seat module can be used as vehicle integrated booster seat for toddlers. Furthermore, such center seat module is easily serviceable, comprises a modular flexible design, is designed lightweight and provides an additional seating space, storage space or occupant comfort component when required. Further, the center seat module, such as a center seat S2, S5 positioned between two seats S1, S3 and S4, S6 may comprise a so-called ABTS structure (all belts to seat structure 20) whilst providing comparatively efficient packaging. Moreover, the center seat module is configured to retain removable components and trim substrates. For example, the center seat module comprises several integral mounting clips, wherein some of them are configured to lock the center seat module to the vehicle 1 and other ones are configured to retain seat components which can be added or exchanged.

Figure 3B:
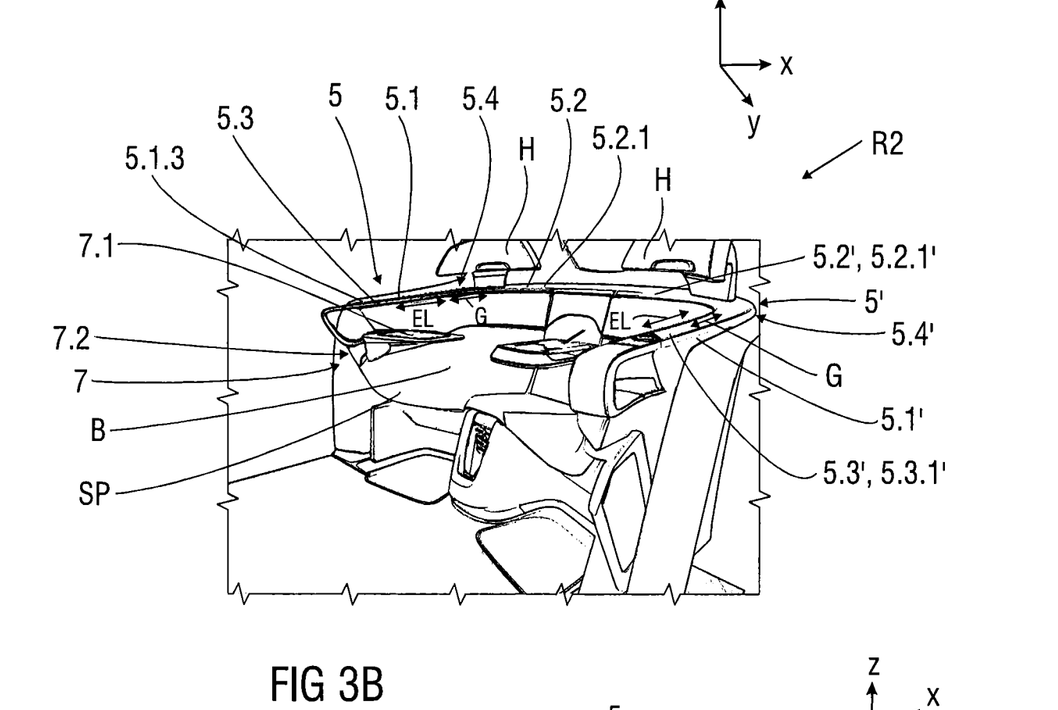
FIG. 3B shows a perspective view of a second embodiment of a vehicle seat row comprising seat assemblies, seats and occupant support components.

FIGS. 3A and 3B show perspective views of an embodiment of a vehicle seat row R2 row comprising seat assemblies 2.4 to 2.6, seats S4 to S6 and occupant support components 5 and 5'. The occupant support components 5, 5' are seating area components for improving comfort feeling and comfort features to occupants of the seats S4, S5. Particularly, the occupant support components 5, 5' may be part of the corresponding seat assemblies 2.4 and 2.6.

The shown occupant support components 5, 5' are configured the same and differ in their orientation. In particular, they are mirrored with respect to an axis parallel to the longitudinal axis x. For example, the occupant support components 5, 5' are configured to improve corner seat assemblies 2.4 and 2.6 or corner seats S4, S6. For instance, the occupant support components 5, 5' define privacy seating areas for occupants.

Figure 7:
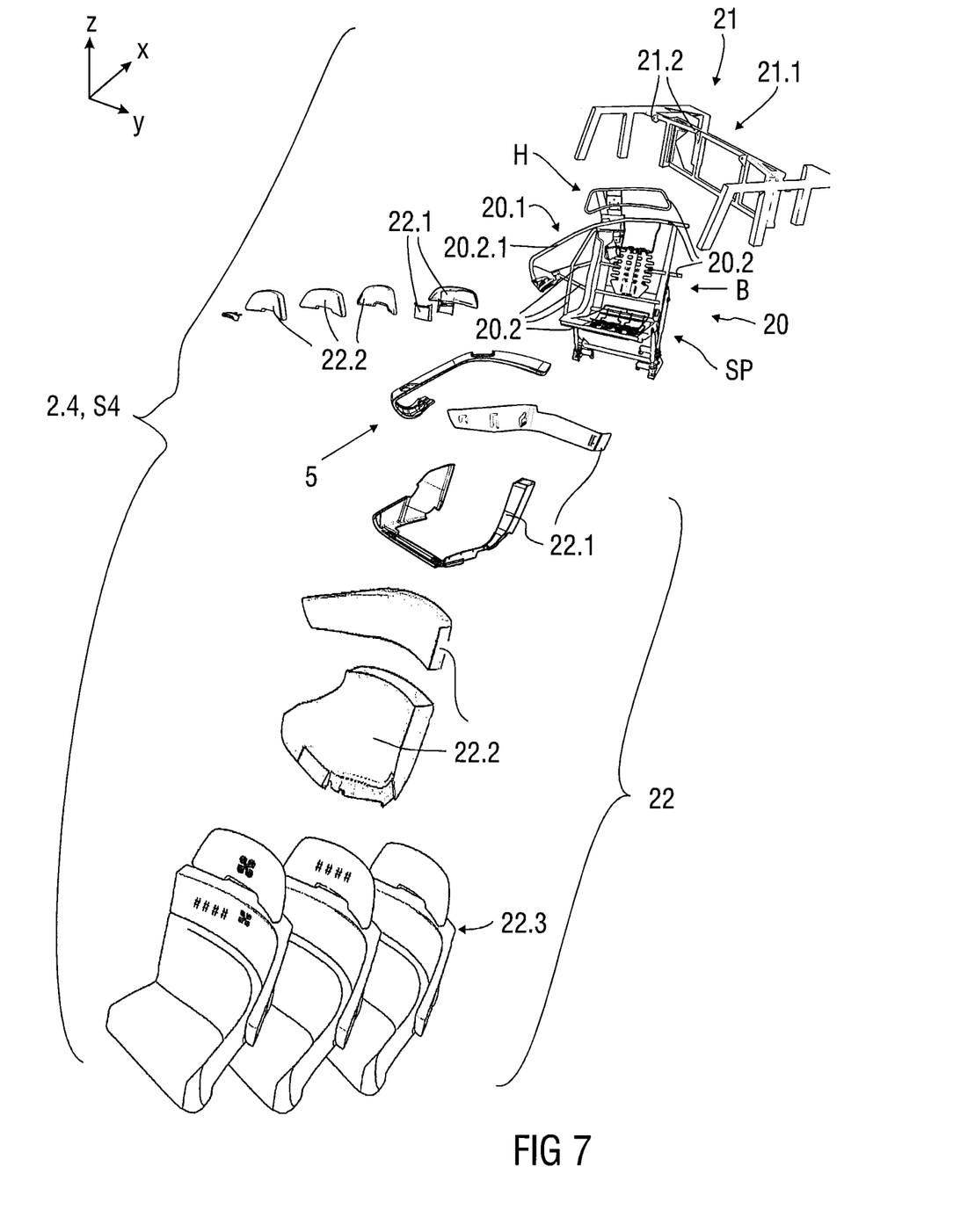
FIG. 7 shows an explosion view of an embodiment of a vehicle seat assembly comprising at least a seat mounting structure, a seat structure, an occupant support component and a seat trim structure.
Figure 8A:
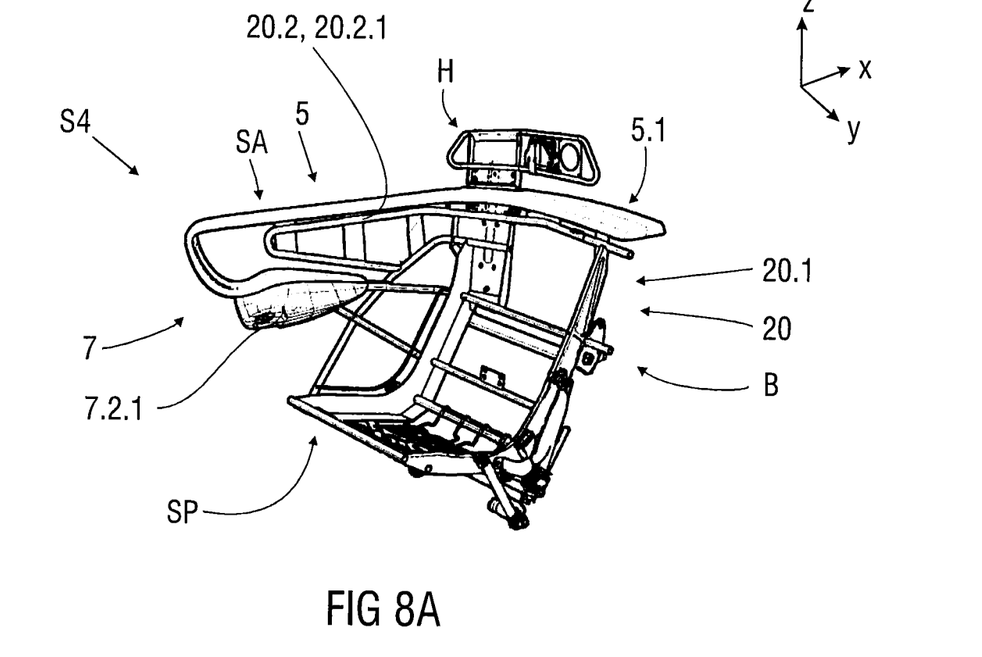
FIG. 8A shows a perspective front view of an embodiment of a seat structure with an occupant support component in a mounted state.
Figure 8B:
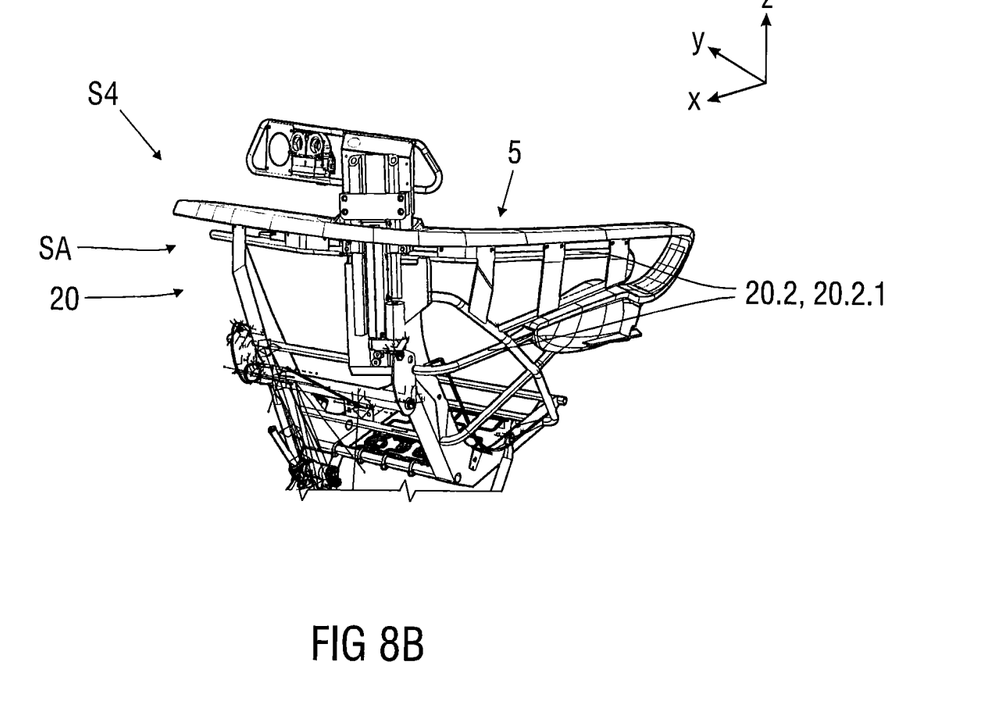
FIG. 8B shows a perspective rear view of an embodiment of a seat structure with an occupant support component in a mounted state.

The occupant support component 5, 5' comprises at least a structural support element 5.1, 5.1'. The structural support element 5.1, 5.1' comprises an upper portion 5.2, 5.2' which is mountable to a backrest B of a respective seat S4, S6. Further, the support element 5.1, 5.1' comprises a side portion 5.3, 5.3' which is mountable to a seat structure 20 as shown in FIGS. 7 to 8B, such as a seat frame structure. Optionally or additionally, the structural support element 5.1, 5.1' may be mounted to vehicle interior structures. The side portion 5.3, 5.3' is arranged on one side of the upper portion 5.2, 5.2'. The upper portion 5.2, 5.2' is configured to define a top surface TS or upper surface of the corresponding vehicle seat S4, S6. The side portion 5.3, 5.3' is configured to define a lateral extending surface LS adjacent the corresponding seat S4, S6. The side portion 5.3, 5.3' is configured as an armrest structure 6 for the corresponding vehicle seat S4, S6. For example, the upper portion 5.2, 5.2' and the side portion 5.3, 5.3' are continuously connected to each other. In particular, upper surfaces 5.2.1, 5.2.1' and 5.3.1, 5.3.1' facing in a direction towards a ceiling of the vehicle 1 of the upper portion 5.2, 5.2' and the side portion 5.3, 5.3' are forming a substantially flat surface. The upper portion 5.2, 5.2' is arranged on the top surface TS of the backrest B. For example, the upper portion 5.2, 5.2' aligns with a top side, such as a cushion, of the backrest B. In a further embodiment, a depth backrest cushion or pad seen in longitudinal direction of the vehicle 1 may be less thick in an upper region of the backrest B compared to common backrest thickness. The upper portion 5.2, 5.2' may be configured to shape the top surface TS of the backrest B, whereas the upper portion 5.2, 5.2' is configured to fixedly retain or movable retain a headrest H for the corresponding vehicle seat S4, S6 with respect to the backrest B. For instance, the headrest H is movable guided through the upper portion 5.2, 5.2'. The side portion 5.3, 5.3' is arranged lateral adjacent the backrest B. For example, the side portion 5.3, 5.3' is arranged substantially above and distanced from a seat pan SP of the corresponding vehicle seat S4, S6. The side portion 5.3, 5.3' comprises an extension length EL at least corresponding with an extension length of the seat pan SP in longitudinal direction of the vehicle 1. In a connection area 5.4, 5.4' of the side portion 5.3, 5.3' and the upper portion 5.2, 5.2' a descending gradient G along an extension direction of the side portion 5.3, 5.3', in particular along the extension length EL, is provided. For example, the side portion 5.3, 5.3' is tilted with respect to a substantially horizontal plane defined by the upper portion 5.2, 5.2' or the top surface TS of the backrest B. The side portion 5.3, 5.3' is tilted with respect to the horizontal plane about an angle of more than 0°, e.g. 1° to 25°, in particular 5° to 15°, preferably 10°. Optionally, the side portion 5.3, 5.3' extends in the same horizontal plane.

Moreover, one or both structural support elements 5.1, 5.1' is or are configured to define a surrounding area SA at least partially surrounding the corresponding seat S4, S6. The structural support elements 5.1, 5.1' are substantially L-shaped. For example, the structural support elements 5.1, 5.1' are configured wing-shaped. According to an embodiment, the structural support elements 5.1, 5.1' for one row R1, R2 of seats S1 to S3 and S4 to S6 may be configured as a one-piece element, particularly substantially U-shaped.

For example, the side portion 5.3, 5.3' and the upper portion 5.2, 5.2' may be seen as forming a substantially L-shape. For instance, upper surfaces 5.2.1 to 5.3.1' of each respective portion 5.2 to 5.3' may be seen as a whole L-shaped upper portion 5.2". A U-shaped side portion 5.3" is coupled to one end side of the L-shaped upper portion 5.2". The U-shaped side portion 5.3" is arranged such that legs of the U-shaped side portion 5.3" are arranged above each other in a vertical direction. In particular, one of the legs of the U-shaped side portion 5.3" and one of the legs of the L-shaped upper portion 5.2" are configured as an integral, merged part. The L-shaped upper portion 5.2" is configured to define the top surface TS of the backrest B and the lateral extending surface LS adjacent the seat S4, S6. The U-shaped side portion 5.3" is configured to be used as armrest structure 6 having an upper armrest structure 6.1 and a lower armrest structure 6.2. Particularly, the upper leg defines an upper armrest and the lower leg defines a lower armrest. The U-shaped side portion 5.3" comprises a number of controllable devices 8 as shown in more detail in FIGS. 6A and 6B. Via the controllable devices 8 the occupant can adjust seat features, such as seat position adjustment, a seat venting and heating system, entertainment features or the like.

Further shown in FIGS. 3A and 3B is a tray table device 7 comprises a tray table element 7.1 and a table support structure 7.2 connected to the tray table element 7.1. The table support structure 7.2 comprises a carrier structure 7.2.1 mounted in a region of the side portion 5.3, 5.3' and a table support linkage 7.2.2, wherein the carrier structure 7.2.1 and the table support linkage 7.2.2 are connected to each other via a single pivot connection. The tray table element 7.1 is continuously movable about the single pivot connection between a vertical stowed position and a horizontal use position. The pivot connection is tilted at about 45°.

Figure 4A:
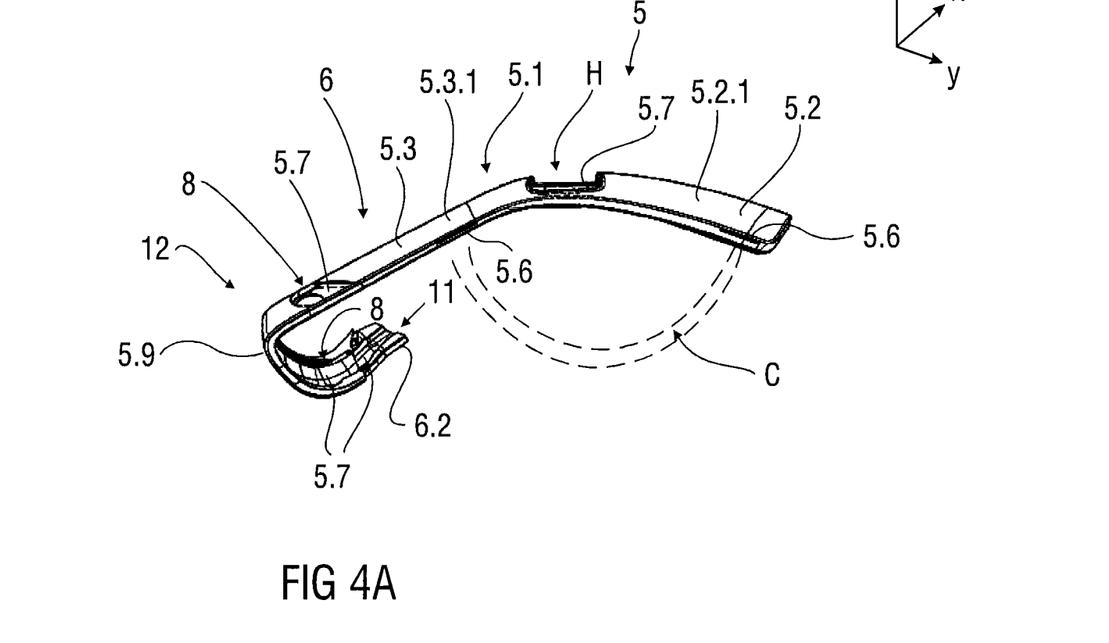
FIG. 4A shows a perspective view of an embodiment of an occupant support component for a vehicle seat.
Figure 4B:
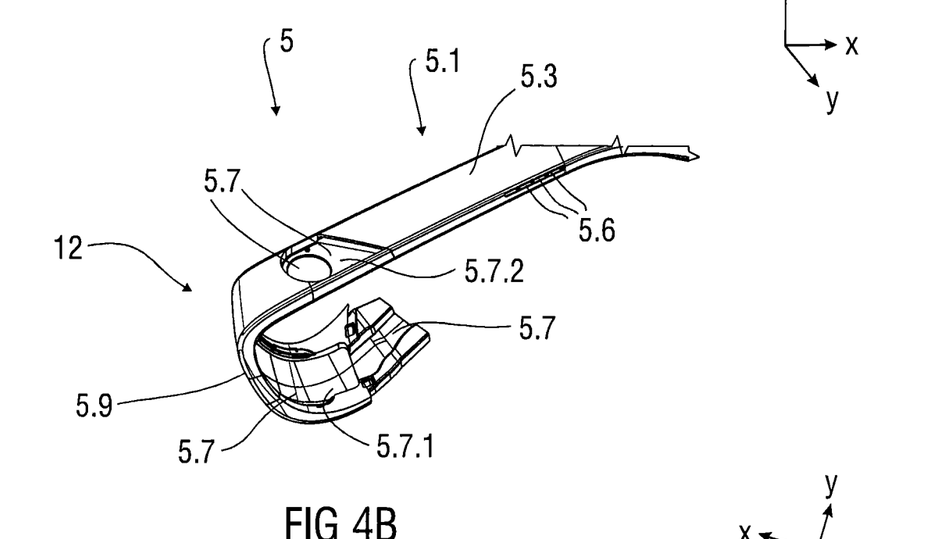
FIG. 4B shows an enlarged perspective view of the embodiment of the occupant support component according to FIG. 4A.

FIGS. 4A and 4B show perspective views of an embodiment of an occupant support component 5 for a vehicle seat S3, S4.

Figure 5:
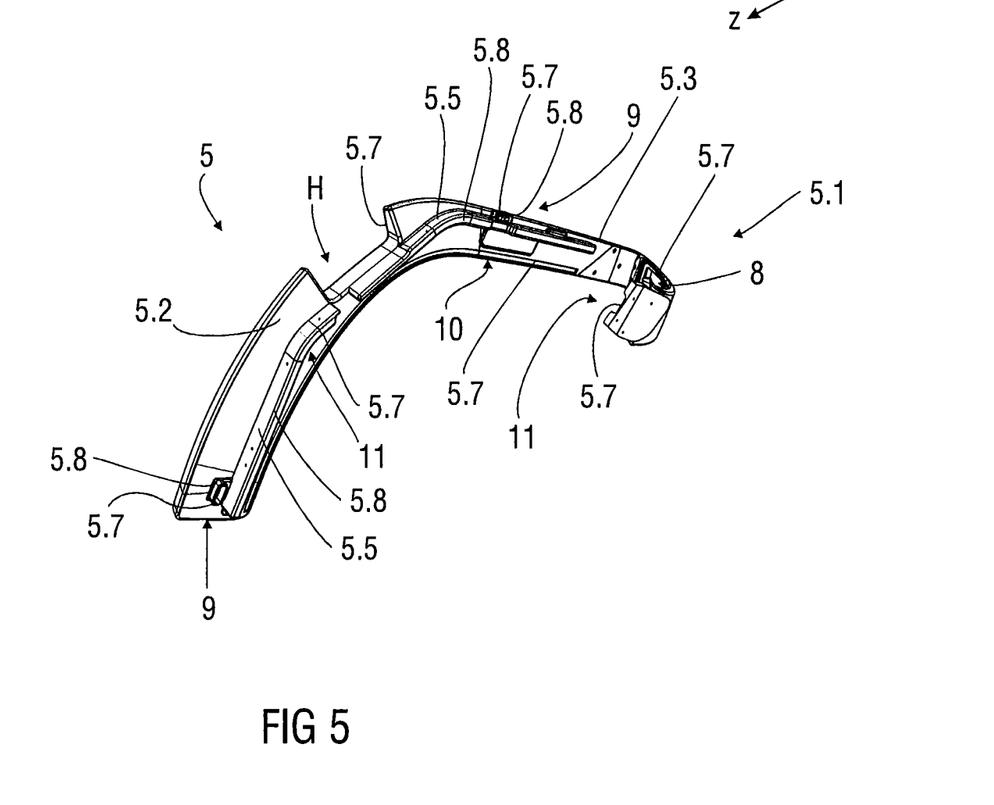
FIG. 5 shows a perspective rear view of an embodiment of an occupant support component for a vehicle seat.

FIG. 5 shows a perspective rear view of the occupant support component 5, in particular a back surface. The occupant support component 5 comprises the structural support element 5.1 which is configured to define a surrounding area SA at least partially surrounding the corresponding seat S3, S4.

The structural support element 5.1 comprises integrated air ducts 5.5, as shown in FIG. 5, and venting holes 5.6, as shown in FIG. 4A. The air ducts 5.5 may be arranged on the back surface. The venting holes 5.6 are air distribution holes arranged on a front side facing in a direction towards a seating area. In communication the air ducts 5.5 are configured to create a climate zone C in the surrounding area SA. In particular, the air ducts 5.5 in communication are configured to create an air circulation and distribution for tempering the climate zone C. When air, heated or cooled, is blown through the air ducts 5.5, the heated or cooled air is distributed through the venting holes 5.6 providing air circulation and distribution to the occupant. The climate zone C can be provided individually to each occupant. Air circulation and distribution as well as tempering are adjustable by the occupant or are automatically adjusted by presets of seat features. For example, air ventilation and heating devices 9 are coupled to the support element 5.1. Further, the support element 5.1 comprises at least one air duct 5.5 arranged and connected with a headrest mounting region to provide air distribution to a headrest air distribution system, e.g. integrated in the headrest H.

Furthermore, the structural support element 5.1 comprises a number of integrated receiving areas 5.7. Moreover, the support element 5.1 comprises a number of projections 5.8. The receiving areas 5.7 are recesses for mounting different devices, such as the occupant controllable devices 8. The projections 5.8 are configured providing or housing air ducts 5.5 coupled to the venting holes 5.6. For example, the receiving areas 5.7 are configured to at least partially embed or retain at least one of a number of venting and heating/cooling devices 9, lighting devices 10, cablings 11, other electric or electronic devices, input and output devices or seat controlling devices 8. For example, at least one of the receiving areas 5.7 is provided to retain the headrest H. The receiving areas 5.7 and the projections 5.8 may also provide mounting and arrangement points to the seat S4, S6 and to the seat structure 20.

The side portion 5.3 further comprises at least one receiving area 5.7 configured as receptacle 5.7.1 for a controllable device 8 configured as touch display. Another receiving area 5.7 is configured as receptacle 5.7.2 for a controllable device 8 configured as an actuation device, e.g. comprising push buttons, knobs or the like. The controllable devices 8 are coupled to a seat control unit. Via the controllable devices 8, adjustment of seat features are operable by the occupant in a comfortable region within reach for all occupant sizes. At least one of the controllable devices 8 may be configured as so called HMI device. The display is curved to fit into the shape of the bent over portion 5.9. Furthermore, the side portion 5.3 comprises an occupant grip structure 12. Moreover, the support element 5.1 comprises a bent over portion 5.9 coupled to one end of the side portion 5.3. The bent over portion 5.9 is substantially U-shaped, C-shaped or J-shaped. The bent over portion 5.9 is bent in a vertical direction away from the upper surface 5.3.1 of the side portion 5.3. For example, the bent over portion 5.9 is bent in a downward direction. Optionally, the bent over portion 5.9 may be bent in an upward direction. For instance, the grip structure 12 is provided by the bent over portion 5.9 for ingress and egress assistance, e.g., for elder occupants.

Particularly, the side portion 5.3, in particular its upper surface 5.3.1, is configured to define an upper armrest structure 6.1 and the bent over portion 5.9 is configured to define a lower armrest structure 6.2.

Figure 6A:
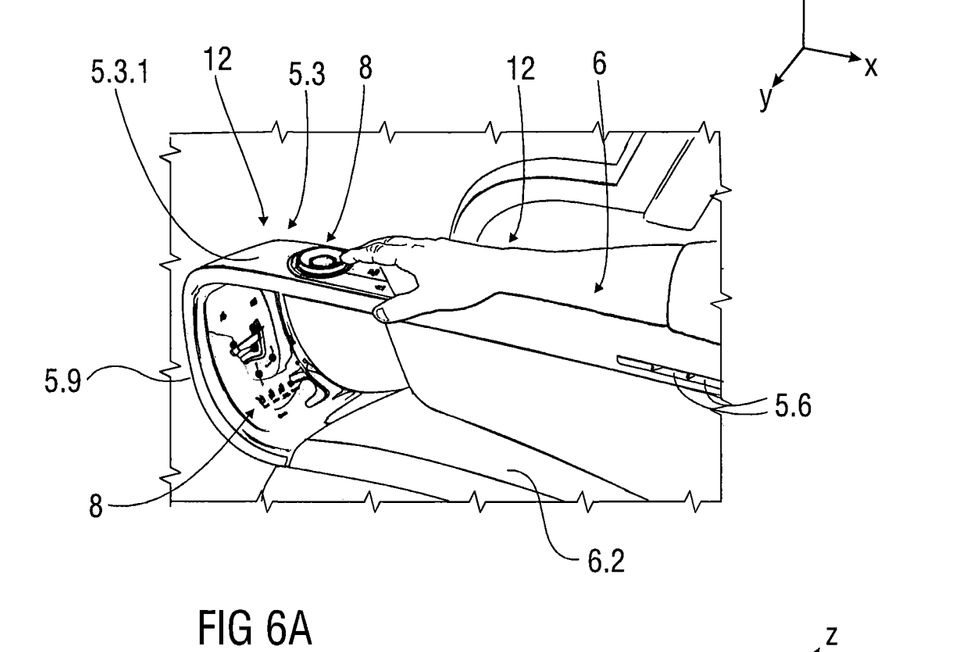
FIG. 6A shows a perspective rear view of an embodiment of an occupant support component for a vehicle seat.
Figure 6B:
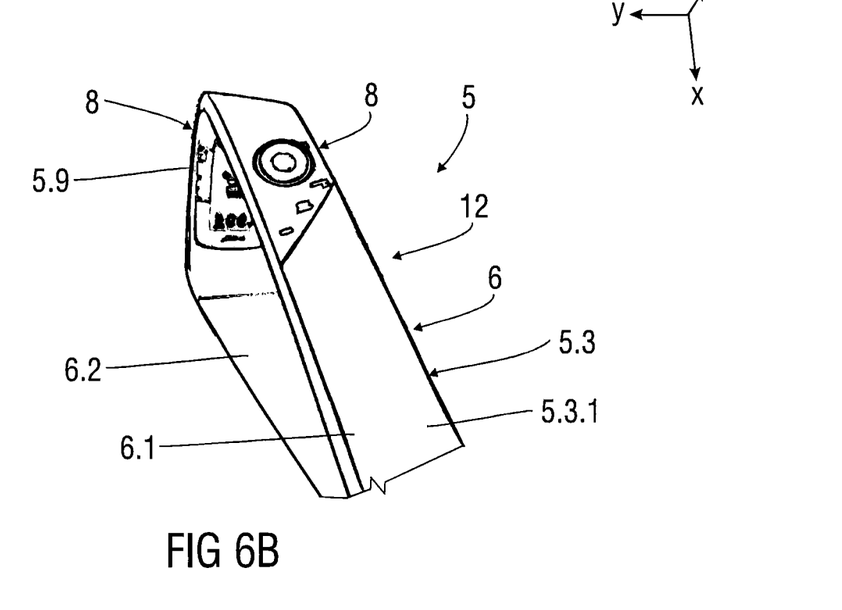
FIG. 6B shows a perspective top view of an embodiment of an occupant support component for a vehicle seat.

FIGS. 6A and 6B show perspective views of an embodiment of an occupant support component 5, in particular controllable devices 8 arranged on a support element 5.1 of the occupant support component 5. For example, the bent over portion 5.9 is slightly shifted in a vertical direction away from the side portion 5.3, in particular with respect to the upper surface 5.3.1 of the side portion 5.3. The lower armrest structure 6.2 is slightly shifted back in a vertical direction towards the side portion 5.3. Thereby, the controllable device 8, in particular the bent touch display, is visible to the occupant so that the occupant can operate the controllable device 8 visibly even when an arm of the occupant is located on the lower armrest structure 6.2.

FIG. 7 shows an explosion view of an embodiment of one of the seat assemblies 2.*n*, e.g. seat assembly 2.4, comprising at least a seat mounting structure 21, a seat structure 20, an occupant support component 5 and a seat trim structure 22. The seat mounting structure 21 is fixed to a floor or a chassis of the vehicle 1. The seat mounting structure 21 comprises a seat rib cage 21.1 to attach and retain the seat structure 20 of the respective seat S4 on the floor or chassis. The seat rib cage 21.1 can be configured to retain one seat structure 20 of at least one respective seat S4 or more than one seat structure 20, e.g. a whole row R1 or R2. The seat mounting structure 21 comprises seat mounting points 21.2 to detachably mount the seat structure 20 to the seat mounting structure 21 e.g. by screws or rivets. The seat rib cage 21.1 may be formed by a plurality of mounting elements, e.g. ribs, tubes, pipes and/or bearing beams, which are connected with each other, e.g. welded or screwed. The seat structure 20 is configured e.g. as a main frame 20.1, e.g. a seat supporting frame made of at least one of metal or composite material. The main frame 20.1 may be formed by a plurality of frame elements 20.2, e.g. ribs, tubes, pipes and/or bearing beams, which are connected with each other, e.g. welded or screwed. The seat structure 20 comprises at least one sub frame element 20.2.1 having a corresponding shape as the shape of the occupant support component 5 to retain it. The sub frame element 20.2.1 is configured to define the top surface TS of the backrest B. The sub frame element 20.2.1 may be substantially L-shaped. The seat trim structure 22 is configured to be detachably attached to the main frame 20.1. The seat trim structure 22 comprises a mounting element 22.1 to which one or more foam support members 22.2 may be detachably arranged, wherein one or more trim elements 22.3 may be arranged onto one or more of the support members 22.2 and detachably attached to the mounting element 22.1.

FIGS. 8A and 8B show perspective views of an embodiment of a seat structure 20 with an occupant support component 5 in a mounted state.

Figure 9A:
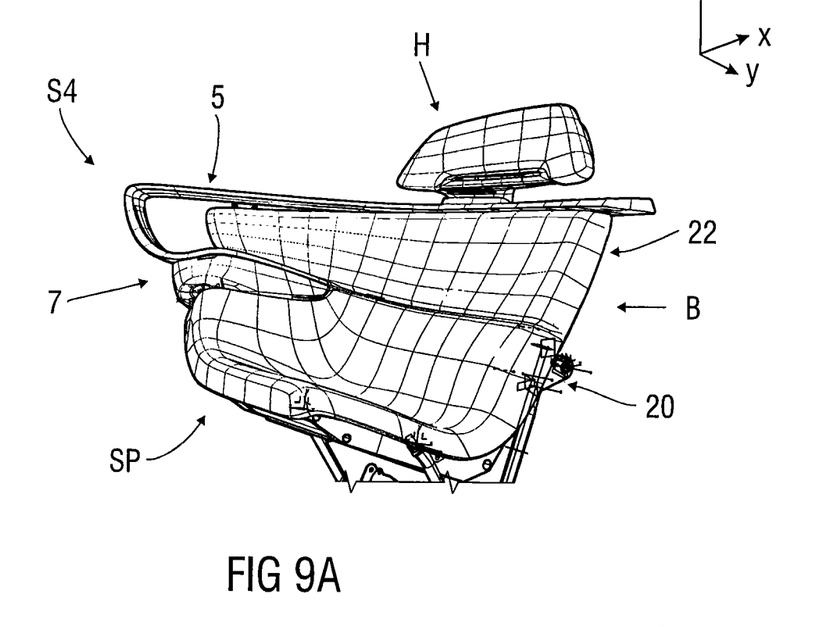
FIG. 9A shows a perspective front view of an embodiment of a seat structure with an occupant support component and a seat trim structure in a mounted state.
Figure 9B:
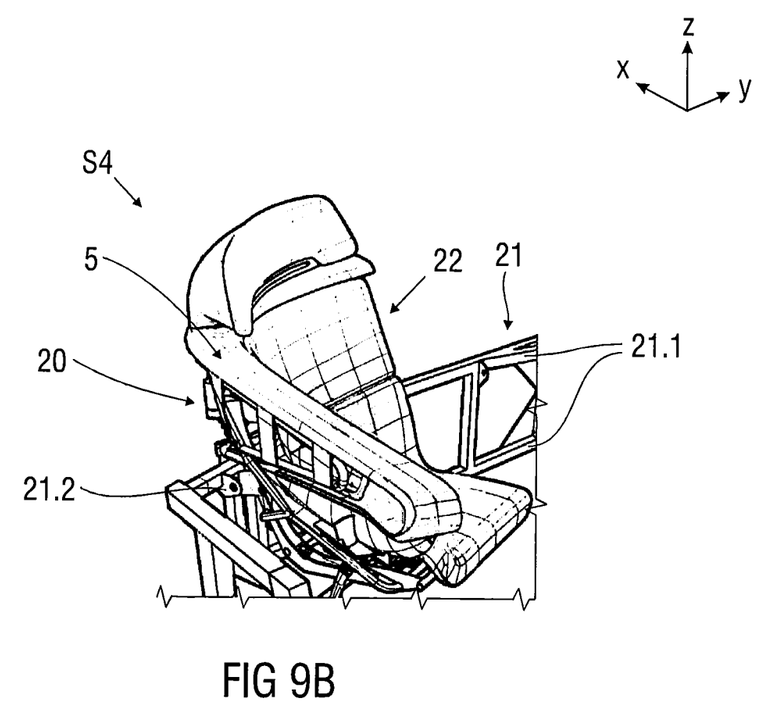
FIG. 9B shows a perspective side view of an embodiment of a seat structure with an occupant support component and a seat trim structure in a mounted state.
Figure 9C:
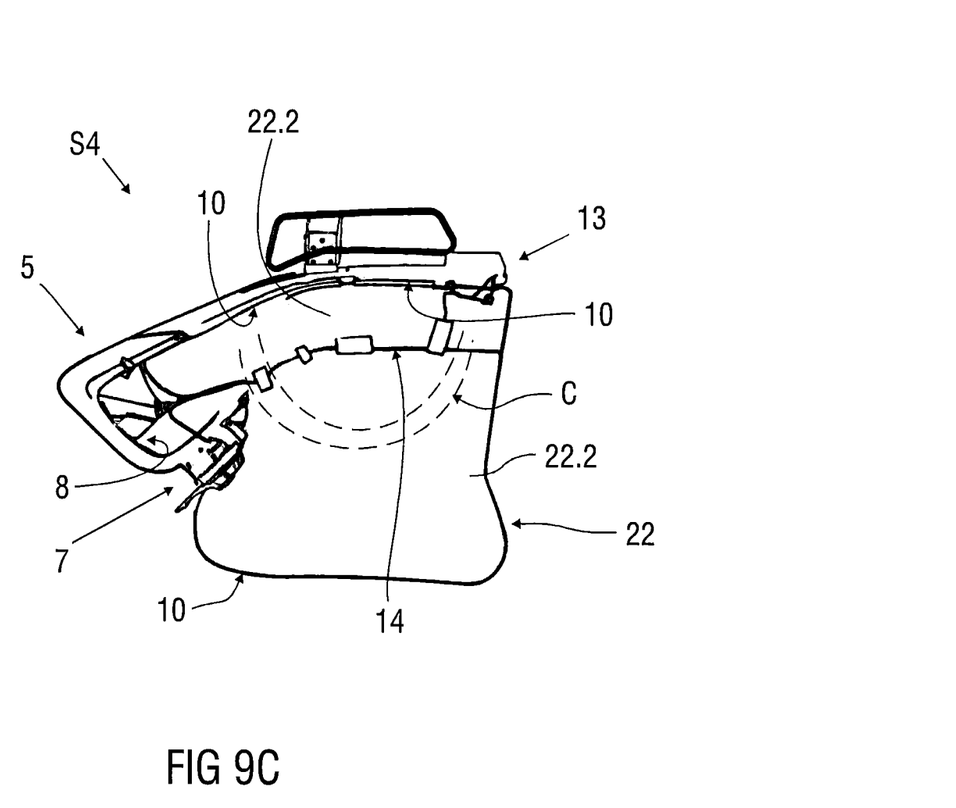
FIG. 9C shows a perspective view of another embodiment of a seat structure with an occupant support component and a seat trim structure in a mounted state.

FIGS. 9A to 9C show perspective views of an embodiment of a seat structure 20 comprising an occupant support component 5 and a seat trim structure 22 in a mounted state. In particular, FIG. 9C shows a vehicle seat S4 having a lighting device 10 such as an LED ambient lighting and occupant information device. The lighting device 10 comprises at least a number of light-emitting diodes and/or lighting strips, which are configured to be activated to inform at least an occupant about one of a seating reservation and/or a direction of travel and/or dynamic motions and/or task related activities. Additionally, the lighting device 10 is configured as ambient mood lighting. In particular, shared mobility scenarios will require seating reservation information that helps occupants to identify their reserved seat S1 to S9 in the vehicle 1. Moreover, the information device 10 informs occupants of sudden vehicle stops and overall direction of travel, e.g. by changing color of light. For instance, user specified color lighting is activated under the seat S4 when the occupant enters the vehicle 1. In another embodiment, the lighting device 10 is also arranged under the seat S4. For instance, a lighting strip is packaged underneath the seat S4 and another lighting strip is packed in the backrest B and/or side area of the seat S4, in particular out of direct sight. The lighting device 10 provides a plurality of color choices for different identification methods. The lighting device 10 provides visual guidance as well as ambient light for mood setting or task related activities. Further, the seat S4 comprises a lighting control unit 13 for controlling the lighting devices 10. The control unit 13 may also be coupled to the controllable device 8 for controlling the adjustment of the tray table 7, seat positions, the climate zone C. The controllable device 8, the lighting devices 10 and the control unit 13 are coupled to each other by a wire arrangement 14. The wire arrangement 14 may be attached to the support members 22.2 and covered by trim elements 22.3 in a fully mounted state of the seat S4.

LIST OF REFERENCES 1 vehicle
2 seat arrangement
2.1 to 2.6, 2.*n* seat assembly
3 vehicle interior
4 storage bin
5, 5' occupant support component
5.1, 5.1' support element
5.2, 5.2'' upper portion
5.2.1, 5.2.1' upper surface
5.3, 5.3'' side portion
5.3.1, 5.3.1' upper surface
5.4, 5.4' connection area
5.5 air duct
5.6 venting hole
5.7 receiving area
5.7.1, 5.7.2 receptacle
5.8 projection
5.9 bent over portion
6 armrest structure
6.1 upper armrest structure
6.2 lower armrest structure 7 table device
7.1 table element
7.2 table support structure
7.2.1 carrier structure
7.2.2 table support linkage
8 controllable device
9 to 11 device
12 grip structure
13 lighting control unit
14 wire arrangement
20 seat structure
20.1 main frame
20.2 frame element
20.2.1 sub frame element
21 seat mounting structure
21.1 rib cage
21.2 mounting points
22 seat trim structure
22.1 mounting element
22.2 support member
22.3 trim element
B backrest
BP position
BS backrest shell
C climate zone
EL extension length
gradient
H headrest
LS lateral extending surface
R1, R2 row
SA surrounding area
S1 to S9 seat
SP seat pan
TS top surface
x longitudinal axis
y transverse axis
z vertical axis

The invention claimed is:

1. An occupant support component for a vehicle seat, comprising at least:
a structural support element comprising at least an upper portion and a side portion which is arranged on one end of the upper portion,
wherein the upper portion is configured to define a top surface of the vehicle seat and the side portion is at least configured as an armrest structure for the vehicle seat,
wherein the side portion comprises a bent over portion arranged on one end of the side portion.

2. An occupant support component for a vehicle seat, comprising at least:
a structural support element which is configured to define a surrounding area at least partially surrounding the seat,
wherein the structural support element comprises at least a number of integrated air ducts which in communication are configured to create a climate zone in the surrounding area,
wherein said structural support element has a side portion arranged on an end of an upper portion of the structural support element,
wherein the side portion comprises a bent over portion arranged on one end of the side portion.

3. The occupant support component according to claim 2, wherein the upper portion is configured to define a top surface of the vehicle seat and the side portion is at least configured as an armrest structure for the vehicle seat.

4. The occupant support component according to claim 1, wherein the upper portion and the side portion are configured as one-piece element.

5. The occupant support component according to claim 1, wherein an upper surface of the upper portion and an upper surface of the side portion each faces in a direction towards a ceiling of a vehicle.

6. The occupant support component according to claim 5, wherein the upper surfaces form a substantially C-shape, L-shape or J-shape.

7. The occupant support component according to claim 1 or 2, wherein the structural support element comprises at least one of a number of receiving areas or a number of projections for different devices.

8. The occupant support component according to claim 7, wherein the receiving areas or projections comprise
air ducts or venting holes or
recesses to at least partially embed or retain at least one of a number of heating devices, lighting devices, cablings, seat assembly parts, electric or electronic devices, input and output devices or seat controlling devices.

9. The occupant support component according to claim 1, wherein the side portion is configured to define an upper armrest structure and the bent over portion is configured to define a lower armrest structure.

10. The occupant support component according to claim 1, wherein a connecting region of the side portion and the bent over portion comprises a receptacle for at least one of an occupant input and output device.

11. The occupant support component according to claim 1, wherein the side portion comprises an occupant grip structure.

12. A vehicle seat for a vehicle, comprising at least:
a backrest and
an occupant support component,
wherein the occupant support component comprising at least a structural support element comprising at least an upper portion and a side portion which is formed on one end of the upper portion,
wherein the upper portion is configured to define a top surface of the backrest and the side portion is at least configured as an armrest structure arranged on laterally with respect to the backrest,
wherein the side portion comprises a bent over portion arranged on one end of the side portion.

13. A vehicle seat for a vehicle, comprising at least:
a backrest and
an occupant support component,
wherein the occupant support component comprising at least a structural support element which is configured to define a surrounding area at least partially surrounding the backrest,
wherein the structural support element comprises at least a number of integrated air ducts which in communication are configured to create a climate zone in the surrounding area;
wherein said structural support element has a side portion arranged on an end of an upper portion of the structural support element,
wherein the side portion comprises a bent over portion arranged on one end of the side portion.

* * * * *